3,359,223
ADHESIVE COMPOSITION CONSISTING OF ACETONE-RESIN AND STARCH AMINE-FORMALDEHYDE CO-CONDENSATION
Yoshimitsu Nakamura, Hirakata, and Katsuhisa Shimizu, Osaka, Japan, assignors to Arakaw Rinsan Kagaku Kogyo Kabushiki Kaisha, Osaka, Japan
No Drawing. Filed Apr. 13, 1967, Ser. No. 630,517
Claims priority, application Japan, Aug. 16, 1962, 37/33,941
7 Claims. (Cl. 260—17.3)

ABSTRACT OF THE DISCLOSURE

An adhesive composition for corrugated paperboard which forms a paste by dispersion in water. The composition is constituted by a water-soluble co-condensation resin and a partly dextrinized starch paste in the presence of an alkali. The resin is an acetone-amine-formaldehyde resin in which the amine is urea, ethylene urea, melamine or mixtures thereof.

CROSS REFERENCES TO RELATED APPLICATIONS

This application is a continuation-in-part of my earlier application Ser. No. 301,987 filed Aug. 14, 1963.

BRIEF SUMMARY OF THE INVENTION

The present invention relates to a composition consisting of starch and a co-condensation resin of formaldehyde, acetone, and an amine selected from the group consisting of urea, ethylene urea, melamine and mixtures thereof. The composition is in the form of a paste by the addition of water and is used as an adhesive for corrugated paperboard.

The operability, adhesive strength and stability of the paste may be improved without adversely affecting the advantage provided by the composition consisting of above two components, viz. its powerful waterproofing property, by further including a neutralized salt of vinyl acetate-maleic anhydride copolymer with alkali in the composition as an additional component.

We have found that an adhesive consisting of an alkali salt of vinyl acetate-maleic anhydride copolymer and starch has an effective action in the adhesion of corrugated paperboard with respect to the operability, adhesive strength and stability of the paste. Further we have found that the addition of a ketone-aldehyde condensation resin to said adhesive is very effective in rendering it waterproof. Recently in the corrugated paperboard industry an increase of operative efficiency has been required and as a result of improvements in the corrugating machines the machine speed has been greatly increased. Furthermore, waterproofing of the adhered faces of double-wall corrugated board is attracting attention. Hitherto in order to render the starch paste waterproof a thermosetting resin such as phenol-formaldehyde resin, or urea-formaldehyde resin has been used. These resins, however, require acidic conditions for the paste for the reaction to occur. The compounding of the adhesives necessitates careful control, the paste life is short, and the machines must be operated at slow speeds and with great care. As mentioned above, further progress is made when an alkaline-setting resin such as a ketone-aldehyde, as for example, resorcinol-aldehyde type is added to the starch paste. However, the waterproofing properties of the bond are not as good as those obtained with the acid-setting resins. We have investigated a large number of synthetic resins which give waterproofing properties to the starch paste. As a result of these investigations we have succeeded in producing an excellent resin which, by the addition of a small amount thereof produces a waterproofing effect as good as that obtained with the acid-setting resins even for an alkaline condition of the paste. According to the present invention, acetone and an amine such as urea, ethylene urea, melamine or mixtures thereof are caused to react with formaldehyde at a temperature between room temperature and 70° C. in the presence of alkaline catalysts such as hydroxides or carbonates of alkali metals or alkaline earth metals (for example caustic soda, caustic potash, calcium hydroxide, magnesium hydroxide, lithium hydroxide, barium hydroxide, sodium carbonate, potassium carbonate) or organic amines (for example methylamine, diethylamine). It is necessary that the amine be present in relation to the acetone in a molar ratio of between 0.1 and 0.6. If less than 0.1 mol of amine is added per mol of acetone, the co-condensation resin does not provide any substantial waterproofing properties for the adhesive. If more than 0.6 mol of urea or ethylene urea or melamine is added to 1.0 mol of acetone, a resin which is capable of being set in alkaline conditions cannot be obtained. The present invention is based upon the discovery of the fact that for 1.0 mol of acetone, it is necessary to add between 0.1 and 0.6 mol of the above mentioned amine in the co-condensation with formaldehyde, to enable the resin to set in alkaline conditions and to render the starch waterproof to the same extent as when amine-formaldehyde condensation resin is mixed in acid conditions. After completion of the reaction, unreacted matter is removed under reduced pressure to yield a water-soluble colorless transparent resin to which starch is added. Further in order to improve the operability, adhesive strength and stability of the paste, the mixture including starch is added and uniformly mixed with an alkali salt of vinyl acetate-maleic anhydride copolymer.

The use of a small amount of the water-soluble, colorless transparent acetone, amine-formaldehyde co-condensation resin according to the present invention has produced an excellent water-proofing effect in adhesives for pasting not only ordinary corrugated paperboard but also double-wall corrugated board by means of a high speed corrugated machine. In general, if a thermosetting resin is added to the starch paste, the stability and adhesive strength of the paste is reduced. However, in accordance with the present invention of an alkali salt of vinyl acetate-maleic anhydride copolymer is mixed jointly with the abovementioned synthetic resin and starch, the stability viscosity and the stability against separation of the paste, that is to say, the operative efficiency and the adhesive strength are considerably improved.

DETAILED DESCRIPTION OF THE INVENTION

In order to explain the invention in greater detail, examples for producing a water-soluble, acetone-amine-formaldehyde co-condensation resin will be given. However, the process for producing this synthetic resin is not limited to these examples but any known process may also be applied to produce a similar synthetic resin.

Example 1

29.0 g. (0.5 mol) of acetone and 194.8 g. (2.4 mol) of 37% formalin are put in a 500 cc. Erlenmeyer flask provided with a thermometer and 12.0 g. (0.2 mol) of urea is added. After complete dissolution of the urea, 11.0 g. of a 20% aqueous solution of caustic soda are gradually added. As the temperature would be raised by the exothermic reaction, the reaction mixture in the flask is kept at a temperature lower than 30° C. by cooling. When the evolution of heat cases, the reaction mixture is left to stand for 24 hrs. at room temperature. After completion of the reaction, unreacted subtances are distilled off at a temperature lower than 50° C., under reduced pressure, to give 201.9 g. of a water-soluble, colorless, transparent resin containing 51.1% of solid matter.

On completion of the reaction, the pH is 10.5. As a result of leaving the aqueous solution of resin for a comparatively short period, free formaldehyde is subjected to a Cannizzaro reaction to form formic acid and the pH falls to about 7.0. If a salt of a weak acid, such as potassium carbonate, is used in place of caustic soda, the fall of the pH may be prevented for a longer period. The desired product can also be prepared by the reaction at 50° C. for 2–3 hrs. in order to shorten the reaction time.

*Example 2*

29.0 g. (0.5 mol) of acetone and 243.5 g. (3.0 mols) of 37% formalin are put in a 500 cc. Erlenmeyer flask provided with a thermometer and 18.0 g. (0.3 mol) of urea are added. After the complete dissolution of the urea, 11.0 g. of a 20% aqueous solution of caustic soda are gradually added. By the same operation as in Example 1, 243.7 g. of a water-soluble colorless, transparent resin containing 47.5% of solid matter are obtained.

*Example 3*

29.0 g. (0.5 mol) of acetone, 162.3 g. (2.0 mols) of 37% formalin and 12.0 g. (0.2 mol) of urea are put in a 500 cc. three-necked flask equipped with a stirrer, thermometer and air cooling condenser. After the complete dissolution of the urea, 5.0 g. of calcium hydroxide are added. As the temperature would be raised by the exothermic reaction, the reaction mixture is retained at a temperature of about 50° C. by cooling with water. When the evolution of heat ceases the mixture is caused to react for 2–3 hrs. at 50° C. in a water-bath. After the completion of the reaction the catalyst is filtered off. The unreacted substance contained in the filtrate is distilled off at a temperature lower than 50° C. under reduced pressure to leave 182.3 g. of a water-soluble, colorless, transparent resin containing 57.2% of solid matter.

*Example 4*

29.0 g. (0.5 mol) of acetone, 194.8 g. (2.4 mols) of 37% formalin and 18.3 g. (0.2 mol) of ethylene urea (purity: 94%) are put in a 500 cc. Erlenmeyer flask provided with a thermometer. After complete dissolution of the ethylene urea 11.0 g. of 20% aqueous solution of caustic soda are added and the same procedure as in Example 1 is followed whereupon 200.5 g. of a water-soluble pale-yellow or colorless, transparent resin containing 58.9% of solid matter are obtained.

*Example 5*

29.0 g. (0.5 mol) of acetone, 243.5 g. (3.0 mols) of 37% formalin and 27.5 g. (0.3 mol) of ethylene urea (purity: 94%) are put in a 500 cc. Erlenmeyer flask provided with a thermometer. After complete dissolution of the ethylene urea, 11.0 g. of a 20% aqueous solution of caustic soda are added and the same procedure as in Example 1 is followed whereupon 198.9 g. of a water-soluble, pale-yellow or colorless, transparent resin containing 51.2% of solid matter are obtained.

*Example 6*

29.0 g. (0.5 mol) of acetone, 194.8 g. (2.4 mols) of 37% formalin and 25.8 g. (0.2 mol) of melamine are put in a 500 cc. four neck flask provided with a stirrer, thermometer, dropping funnel and reflux condenser. To this mixture 11.0 g. (0.055 mol) of 10% aqueous solution of caustic soda are added dropwise. As the temperature would be raised by the exothermic reaction, the flask is cooled with water so as not to allow the temperature to rise above 70° C. After the evolution of heat ceases the mixture is caused to react for 30 minutes at 70° C. in a water bath. The reaction system at first shows white-turbidity owing to the presence of melamine, but with the progress of the reaction the system becomes slightly yellow and then transparent because of the decrease in unreacted melamine. After completion of the reaction, a small amount of the unreacted formaldehyde remains and is distilled off, together with water, at a temperature lower than 50° C., under reduced pressure, to leave 207.0 g. of a water-soluble, slightly yellow, transparent resin containing 51.2% of solid matter. In contrast with the known melamine-formaldehyde resins, the resin produced according to this process has a very long pot life and is substantially not changed in quality permanently.

In the production of said water-soluble acetone amine-formaldehyde co-condensation resins, urea, ethylene urea and melamine may be used separately or in combinations of two or three thereof. It is essential to use the amine in an amount between 0.1 and 0.6 mol per mol of acetone as explained previously. Furthermore, the proportion of the sum of acetone and amine to aldehyde is 1 mol: 2–6 mols. The reaction temperature must be less than 70° C. In general, it is preferable that the temperature be between room temperature and 70° C. At a temperature higher than 70° C., the molecular weight of the resin produced will become excessively large and the resin hardly dissolves in water so that the efficiency for affording waterproofing properties will be reduced. The amount of the water-soluble co-condensation resin to be added to the starch paste is preferably 0.5–5 parts (by weight) in solid matter of the resin to 100 parts of the starch alone. When an alkali salt of vinyl acetate-maleic anhydride copolymer is added to the starch paste, it is added in a quantity of between 0.25 and 5 parts by weight to 100 parts of starch.

The following example shows the addition to the paste of an alkali of vinyl acetate-maleic anhydride copolymer which can be effectively admixed as a third component in order to improve the stability of the viscosity and the stability against separation of the paste and to improve the operability, adhesive strength and stability of the paste in the present composition.

20 g. of vinyl acetate, 20 g. of maleic anhydride and 500 g. of benzene are put in a 1 liter three-neck flask equipped with a stirrer, thermometer and reflux condenser. The mixture is caused to react for two hours at about 80° C. in the presence of 0.2 g. of benzoyl peroxide as a polymerization initiator. After completion of the reaction, benzene is filtered off and the copolymer produced is dried to constant weight under heating at 80–100° C. in a vacuum heating drier. Yield is quantitatively 40 g.

40 g. of the copolymer is dissolved in 200 g. of water while heating. After cooling, the solution is neutralized with a solution of 14.7 g. of caustic soda in 47.8 g. of water to give 320 g. of a 15% aqueous solution of the sodium salt of the vinyl acetate-maleic anhydride copolymer.

In order to make the excellent action and effectiveness of the present composition clear, the experimental results obtained by employment of the composition as adhesive for corrugated paperboard will next be shown. At present, in many corrugated paperboard factories a standard composition is adopted as the starch paste for adhering the corrugated paperboard. In this experiment a starch paste which was prepared in advance according to the following standard process was used as the starch which is one component of the composition to be used. To this starch paste several synthetic resins were mixed and were used as the paste composition.

The amount of the starch paste to be combined is as follows:

Main portion:

| | G. |
|---|---|
| Starch | 96 |
| Water | 163 |
| Borax | 2.9 |

Carrier portion:

| | |
|---|---|
| Starch | 12.8 |
| Water | 232.8 |
| Caustic soda | 1.9 |
| Water | 93.2 |

In the main portion, starch was suspended in water and borax was dissolved therein. In the carrier portion 12.8 g. of starch was suspended in 232.8 g. of water and mixed with a solution of 1.9 g. of caustic soda in 93.2 g. of water. The carrier portion was mixed with the main portion to prepare a starch paste the starch content of which is about 17% by weight. This starch paste is referred to as being "partly dextrinized" by the presence of the alkali. Generally, the amount of alkali is between 1 and 3% by weight of the starch. Such starch paste is generally designated as a starch adhesive of the "Steinhall process." To this starch paste, the synthetic resins obtained in each of the examples were added to make the following samples.

*Sample 1.*—A 30% aqueous solution of the water-soluble acetone-urea-formaldehyde co-condensation resin obtained in Example 1 was mixed with an amount of 10% by weight of the starch paste (about 1.7% of the starch) to give the desired composition.

*Sample 2.*—A composition was obtained according to sample 1, using a 30% aqueous solution of the water-soluble acetone-ethylene urea and formaldehyde co-condensation resin produced in Example 4.

*Sample 3.*—A 30% aqueous solution of the water-soluble acetone-urea-formaldehyde co-condensation resin produced in Example 1 was mixed with a 15% aqueous solution of the sodium salt of vinyl acetate-maleic anhydride copolymer in the proportion of 4:6 by weight and the mixture was added to the starch paste in an amount of 15% of the starch paste about 2.6% of the starch) to give the desired composition.

*Sample 4.*—A composition was obtained according to sample 3, using a 30% aqueous solution of the water-soluble acetone-ethylene urea-formaldehyde co-condensation resin product in Example 4.

*Sample 5.*—A commosition was obtained according to sample 3, using a 30% aqueous solution of the water-soluble acetone-melamine-formaldehyde co-condensation resin produced in Example 6.

*Sample 6.*—A 21% aqueous solution of the water-soluble acetone-urea-formaldehyde co-condensation resin produced in Example 1 was mixed with a 15% aqueous solution of the sodium salt of vinyl acetate-maleic anhydride copolymer in the proportion of 4:6 by weight and the mixture was added in an amount of 10% to the starch paste.

A corrugated paperboard of an adhesive area 1 mm. x 15 mm. (liner board: 240 g./m.² and corrugating medium 140 g./m.²) was prepared under the adhesive conditions as shown in Table 1, using the aforesaid samples. The waterproof properties of the corrugated paperboard were examined by a method wherein the above corrugated paperboard of an adhesive area 1 mm. x 15 mm., is loaded with 100 g. weight and suspended in a thermostatic water bath at 20° C. to determine the time before the sheet falls off. As is clear from Table 1, remarkable waterproofing is obtained in a shorter time and at a lower temperature compared with the starch paste alone and the hitherto known resins.

In the Table 1:

Mark X—fell off within 10 minutes (negligible waterproofing)

Δ—fell off within 1 hr. (poor)

0—fell off within 24 hrs. (good)

00—did not fall off within 24 hrs. (excellent).

TABLE 1

| Adhesive agents | Adhesive condition | | | | | | | | | | | | | | | | | |
|---|---|---|---|---|---|---|---|---|---|---|---|---|---|---|---|---|---|---|
| | 120° C. | | | | | | 140° C. | | | | | | 160° C. | | | | | |
| | 10 sec. | 20 sec. | 40 sec. | 60 sec. | 90 sec. | 120 sec. | 10 sec. | 20 sec. | 30 sec. | 60 sec. | 90 sec. | 120 sec. | 10 sec. | 20 sec. | 30 sec. | 40 sec. | 60 sec. |
| Sample 1 | X | 0 | 00 | 00 | 00 | 00 | X | 00 | 00 | 00 | 00 | 00 | 0 | 00 | 00 | 00 | 00 |
| Sample 2 | X | X | 00 | 00 | 00 | 00 | X | 0 | 00 | 00 | 00 | 00 | X | 0 | 00 | 00 | 00 |
| Sample 3 | X | Δ | 00 | 00 | 00 | 00 | X | 0 | 00 | 00 | 00 | 00 | Δ | 00 | 00 | 00 | 00 |
| Sample 4 | X | X | 00 | 00 | 00 | 00 | X | Δ | 00 | 00 | 00 | 00 | X | 00 | 00 | 00 | 00 |
| Sample 5 | X | Δ | 00 | 00 | 00 | 00 | X | 00 | 00 | 00 | 00 | 00 | Δ | 00 | 00 | 00 | 00 |
| Composition A [1] | X | X | X | X | X | X | X | Δ | 0 | 00 | 00 | 00 | X | Δ | 00 | 00 | 00 |
| Composition B [2] | X | X | X | X | X | X | X | X | X | Δ | 0 | 00 | X | 00 | 00 | 00 | 00 |
| Starch Paste only | X | X | X | X | X | X | X | X | X | X | X | X | X | X | X | X | X |

[1] Composition A.—This composition was identical with that of the Sample 1 except that instead of the resin solution in Example 1, the composition used was: Aqueous solution of partially alkylated melamine-formaldehyde resin (methylol groups partially etherified with ethanol). Properties: Appearance, colorless transparent liquid, non-volatile (percent), 39.3; viscosity, 8.95 cp. (Brookfield type viscometer, 25° C.); specific gravity: 1.101 (25° C.).

[2] Composition B.—This composition was identical with that of the sample 1 except that instead of the resin solution in Example 1, the composition used was: Aqueous solution of a mixture of ammonium salt of vinyl acetate-maleic anhydride copolymer and acetone-formaldehyde precondensation resin. Properties: pH, 7.3; appearance, orange color, viscous liquid; viscosity, 1760 cp. (Brookfield type viscometer No. 2, 25° C.); non-volatile (percent), 31.8.

The double faced corrugated paperboard (15 mm. x 5 flutes) prepared under adhesive condition of 140° C. and 20 seconds using the composition of samples 1 and 2 above was subjected to maximum weight until it fell off by means of Shopper's paper tensile strength tester which indicated adhesive strength. The result of the determination is shown in a Table 2. From this table it is observed that the adhesive strength is also raised by the use of the composition of samples 1 and 2 above not only compared to that of the hitherto known paste but also the starch paste alone.

TABLE 2

| Adhesive agents | Adhesive strength (kg.) | | |
|---|---|---|---|
| | Maximum | Minimum | Average |
| Sample 1 | 5.6 | 4.3 | 5.0 |
| Sample 2 | 5.9 | 4.9 | 5.6 |
| Composition A | 5.2 | 3.6 | 4.2 |
| Composition B | 5.3 | 3.8 | 4.3 |
| Starch paste only | 5.3 | 3.9 | 4.4 |

A single faced corrugated board (corrugating medium is SCP—140 g./m.²) and a liner board (RB=300 g./m.²) are pasted at 130° C., for 5 seconds using the composition in sample 3. When compared with the known adhesive agents, it is observed from the following Table 3 that by the addition of a small amount of the composition, higher adhesive strength at high temperature and high humidity and also better waterproofing properties are attained.

TABLE 3

| Adhesive agents | Adhesive strength [1] | | | | Waterproofing properties [2] |
|---|---|---|---|---|---|
| Sample 6 | 12.4 | 12.4 | 11.9 | 12.2 | ◎ |
| Composition A | 10.3 | 9.7 | 10.8 | 10.3 | △ |
| Starch paste only | 11.4 | 11.4 | 11.9 | 11.6 | X |

[1] Adhesive strength is measured by means of Pin adhesion tester after leaving the test piece alone for 48 hrs. in 90% relative humidity at 40° C. Waterproofing properties are determined with respect to the condition of a corrugated paperboard after immersing in water at 20° C. for 24 hrs.
[2] X represents complete separation. △ represents partial separation. ◎ represents no separation.

Additionally, double-wall corrugated paperboard were pasted together with the composition of sample 3 by a by a corrugated paperboard making machine, and the adhesive strength was measured by means of a Pin adhesion tester, the results of which are shown in Table 4.

TABLE 4

| Testing pieces | Adhesive agents | Adhesive strength (kg.) | | |
|---|---|---|---|---|
| | | Maximum | Minimum | Average |
| I | Sample 6 | 24.00 | 18.25 | 21.34 |
| | Composition B | 21.25 | 16.25 | 18.95 |
| II | Sample 6 | 31.50 | 27.50 | 29.22 |
| | Composition B | 27.75 | 25.50 | 26.78 |

NOTE.—Testing piece I, 50 mm. x 50 mm. (5-6 flutes); II, 31 mm. x 81 mm. (12-13 flutes).

When a partly dextrinized starch paste in alkaline state is used as an adhesive agent, the pasted surfaces are affixed and settled for a determined time under definite temperature or pressure conditions. This settling condition is expressed by the term "adhesive condition" in the present specification. For example, in the corrugated paperboard manufacture, a hot plate of 100°–140° C. would be pressed on back of affixed paper for 10–120 seconds. In this case the "adhesive condition" would be expressed 100° C.; 10 sec. or 140° C.; 120 sec.

It has been stated hereinbefore that it is critical that the molar ratio of amine to acetone be within the range of 0.1 and 0.6. This will be demonstrated hereafter:

If the molar ratio to acetone is less than 0.1 mol the acetone-amine-formaldehyde resin produced shows only the same properties as those of acetone-formaldehyde resin and its water proofness as an adhesive is diminished. That is to say, when boards adhered together are immersed in water and the time before the adhered faces naturally peel off is measured, said time will shorten considerably with a resin (adhesive) wherein the mol ratio of amine is less than 0.1 mol. The above is clearly shown in the following experiments, wherein resins were prepared as in Example 1 with the following components.

(1) Acetone 29.0 g. (0.5 mol), 37% formalin 121.8 g. (1.5 mol)
(2) Acetone 29.0 g. (0.5 mol), 37% formalin 126.6 g. (1.56 mol) and urea 1.5 g. (0.025 mol)
(3) Acetone 29.0 g. (0.5 mol), 37% formalin 136.4 g. (1.68 mol) and urea 4.5 g. (0.075 mol)

Each water soluble resin obtained from the compositions (1), (2) and (3) are treated in the same manner as described in sample 1 to produce corresponding adhesives. A single corrugated board and a liner paper are adhered together with the aforesaid adhesives under the condition of 130° C.; five seconds. The corrugated paperboards thus produced are immersed in water at 20° C. and thus the time before the adhesive faces naturally peel off are measured respectively. The results are shown as follows:

Acetone/urea:      Naturally peel off time (hrs.)
(1) 1 mol/0 mol _____ 80
(2) 1 mol/0.05 mol _____ 90
(3) 1 mol/0.15 mol _____ 130

It has been found that with respect to ethylene urea and melamine similar results are obtained.

If the molar ratio of amine to acetone is more than 0.6 mol, the actetone-amine-formaldehyde resin produced shows the same properties as those of amine formaldehyde resin, that is to say, the hardening of said resin becomes slower in alkaline state and with increase of amine it becomes hardened only in acid state. This is clearly established by the following experiments, wherein resins were prepared as in Example 2 with the following components.

(1) The condensation resin of Example 2,
(2) Acetone 29.0 g. (0.5 mol), 37% formalin 260.0 g. (3.2 mol) and urea 21 g. (0.35 mol),
(3) Acetone 29.0 g. (0.5 mol), 37% formalin 292.3 g. (3.6 mol) and urea 24.0 g. (0.4 mol),
(4) 37% formalin 243.6 g. (3.0 mol) and urea 60.0 g. (1 mol).

Each water soluable resin obtained from the compositions (1), (2), (3) and (4) above, were treated in the same manner as described in Sample 1 to produce the corresponding adhesives (solid content 30%) respectively. Then the time before the adhesives change to a solid gel-like material by adding 10 g. of 30% NaOH solution to 40 g. of said adhesives are measured. The results are shown as follows:

Acetone/urea:      Gel time (hrs.)
(1) 1 mol/0.6 mol _____ 0.25
(2) 1 mol/0.7 mol _____ 1
(3) 1 mol/0.8 mol _____ 2.5
(4) 0 mol/1 mol _____ 72

It has also been found that with respect to ethylene urea, and melamine similar results are obtained.

What is claimed is:

1. An adhesive composition for corrugated paperboard which forms a paste by dispersion in water, said composition comprising a water-soluble co-condensation resin and starch, partly dextrinized in the presence of an alkali, the resin being produced by reacting 1 mol of acetone, 0.1–0.6 mol of at least one amine selected from the group consisting of urea, ethylene urea, and melamine; and 2 to 6 mols of formaldehyde for each mol of the sum of acetone and amine in the presence of an alkaline catalyst at a temperature of less than 70° C.

2. An adhesive composition as claimed in claim 1, wherein the composition further comprises an alkali salt of vinyl acetatemaleic anhydride copolymer.

3. An adhesive composition as claimed in claim 1 wherein the resin is present in an amount between 0.5 and 5 parts by weight for 100 parts by weight of starch.

4. An adhesive composition as claimed in claim 3, wherein the composition further comprises 0.25 to 5 parts by weight of an alkali salt of vinyl acetate-maleic anhydride copolymer for 100 parts by weight of starch.

5. A method of rendering a starch paste waterproof comprising adding to said paste a resin which is produced by reacting 1 mol of acetone, 0.1 to 0.6 mol of at least one amine selected from the group consisting of urea, ethylene urea, and melamine; and 2–6 mols of formaldehyde for each mol of the sum of acetone and amine in the presence of an alkaline catalyst at a temperature of less than 70° C.

6. A method as claimed in claim 5, wherein 0.5 to 5 parts by weight of said resin is added to 100 parts by weight starch.

7. A method as claimed in claim 6 wherein an alkali salt of vinyl acetate-maleic anhydride copolymer is mixed with said paste, in an amount between 0.25 to 5 parts by weight per 100 parts by weight of starch.

References Cited

UNITED STATES PATENTS

| | | | |
|---|---|---|---|
| 2,518,963 | 8/1950 | Weaver | 260—69 |
| 2,683,104 | 6/1954 | Harvey et al. | 260—64 |
| 2,908,603 | 10/1959 | Scott | 260—69 |
| 2,935,484 | 3/1960 | Arnold et al. | 260—17.4 |

FOREIGN PATENTS

| | | |
|---|---|---|
| 591,589 | 1/1960 | Canada. |
| 138,032 | 6/1961 | U.S.S.R. |
| 127,393 | 8/1960 | U.S.S.R. |

WILLIAM H. SHORT, *Primary Examiner.*

E. M. WOODBERRY, *Assistant Examiner.*